Patented Apr. 29, 1947

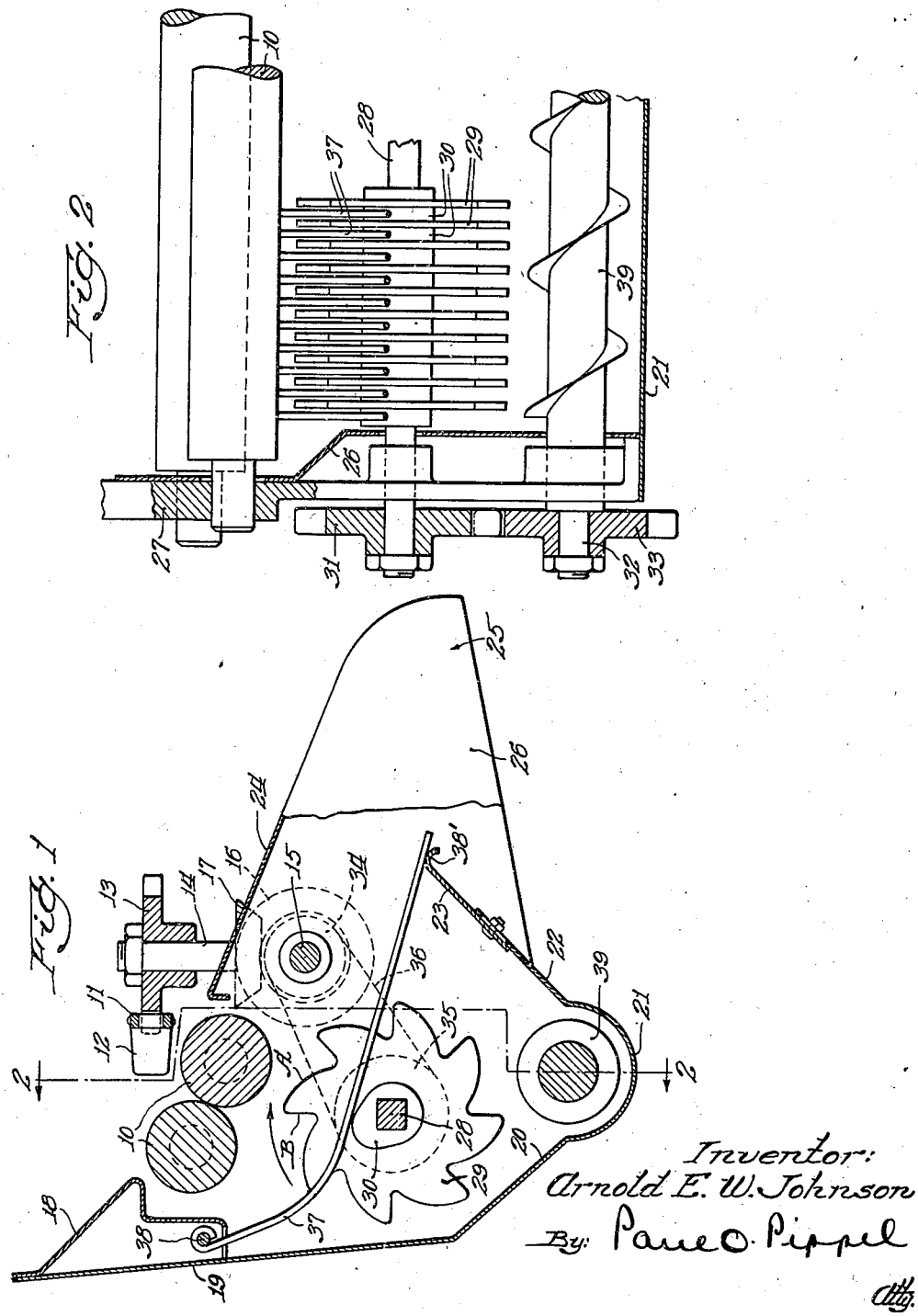

2,419,898

UNITED STATES PATENT OFFICE 2,419,898

SHELLED CORN SAVER FOR HUSKING DEVICES

Arnold E. W. Johnson, Oak Park, Ill., assignor to International Harvester Company, a corporation of New Jersey Application December 10, 1943, Serial No. 513,816

3 Claims. (Cl. 130—5)

This invention relates to a husking device. More specifically, it relates to a shelled-corn saving and recovering device for use with husking rolls. In conventional husking means for ear corn after it has been snapped from the stalks, rolls are usually utilized for gripping the shucks and removing them from the ears. The same type of husking device is usually utilized whether the corn is snapped from standing stalks by a traveling picker or removed from cut stalks either by a traveling machine or by a stationary snapper and husker. When the corn is dry, there is considerable shelling particularly around the butt ends of the ears when the husks are being removed. This is particularly true of the hybrid corn which is being grown very extensively at the present time. There is also some loss of shelled corn upon snapping the ears when the husks are quite loose and when the corn is frozen or very dry. Devices have been developed which recover the shelled corn removed during snapping and deliver this shelled corn along with the ears to the husking device. The present invention relates to shelled-corn saving and recovering mechanism adapted to be located beneath the conventional type of husking device.

The principal object is to provide an improved, simplified, and effective mechanism to thoroughly shake and agitate the husks and trash passing through the husking rolls to remove the shelled corn therefrom.

Another object is to provide husk and trash discharge mechanism.

Another object is to provide means for removing the shelled corn.

These objects are accomplished by a construction such as illustrated in the drawings.

Figure 1 is a vertical section showing a roll type of husking mechanism with the grain-saving device incorporated therewith;

Figure 2 is a vertical section substantially on the line 2—2 of Figure 1.

In the drawings only such portions of a corn-husking mechanism are shown as are necessary to illustrate the invention. A pair of husking rolls 10 are mounted adjacent each other with one being on an axis somewhat below the other. An ear-forwarding chain 11 having forwarding elements 12 is mounted on a sprocket 13 driven by a vertical shaft 14. The elements making up this structure are positioned so that the forwarding elements 12 carry the ears along the husking rolls in a position where the husks will be grasped by the husking rolls which operate in the conventional manner with the contacting portions moving downwardly in the same direction, the rolls rotating in opposite angular directions. A longitudinal shaft 15 is indicated as carrying a bevel gear 16 which meshes with and drives a bevel gear 17 on the vertical shaft 14. It is to be understood that any type of conventional mechanism may be utilized for driving the husking rolls, ear-forwarding means, and the moving elements of the shelled-corn saving device. A housing structure is illustrated including a deflector wall 18 which projects adjacent the upper husking roll 10 to assure the delivery of ear corn to the husking position between the rolls. A substantially vertical wall 19 of the housing structure extends downwardly, being joined to an inwardly sloping wall 20 which in turn joins a semi-cylindrical wall 21 which forms the bottom of the shelled-corn receiving chamber. At the side of said cylindrical wall, opposite the wall 20, an upwardly and outwardly slanting wall 22 is connected by adjustable means to a slidable wall section 23. Adjacent the lower husking roll an outwardly and downwardly sloping wall 24 curves over at its lower end to form a hood 25 which forms a discharge chute for the husks and other material passing through the husking rolls after the shelled corn has been removed therefrom. An end wall 26, as shown in Figure 2, closes in the end of the discharge chute.

A portion of a frame structure has been indicated in the form of an end member 27 which provides journal means for the husking rolls 10 and for the corresponding rotating shafts, as will be subsequently described. A shaft 28, parallel to the husking rolls and spaced a substantial distance therebelow, carries a plurality of generally circular elements 29 which may be described as notched disks due to the peripheral formation thereof. Said elements are separated by a plurality of cams 30, said cams and said elements being carried for rotation with the shaft and against rotation relative to each other, preferably by utilizing a square shaft and square openings in the elements and the cams.

The shaft 28 and the elements carried thereby are operated in the direction indicated by the arrow of Figure 1. It will be noted that the notches have a particular configuration which is not symmetrical in both directions. In the direction of rotation, the formation of the notch is sufficiently curved rearwardly, as indicated by the reference character A in Figure 1. The rear side of the projection, or the forward side of the notch, is formed substantially on a radial line, as indicated by the character B. This formation has a particular function, as will be hereinafter described.

The shaft 28 extends through the end member 27. A gear 31, illustrated as being mounted on the end of said shaft, shows diagrammatically a means of driving a second shaft 32 by means of a drive sprocket 33 mounted thereon. By dotted lines in Figure 1 a means of driving the shaft 28 from the shaft 15 is diagrammatically illustrated. Said shaft may be driven by a sprocket 34 on the shaft 15 and a sprocket 35 on the shaft 28, said sprockets being connected by a drive chain 36.

A plurality of rod-like shaker elements 37 are pivotally mounted on a shaft 38 at substantially the same height as the husking rolls. Said elements are spaced apart and extend downwardly and outwardly between the notched disks 29. The spacing of the disks by the cams 30 is such that the elements 30 have freedom between the rotating disks. Said elements extend outwardly over the upper edge of the adjustable wall 23, said wall having a curved abutment 38' on which the elments rest.

A grain-conveying auger 39 is rotatably mounted on the shaft 32, previously described, being fitted in the trough-like portion of the grain-receiving chamber formed by the cylindrical wall 21. Said auger serves as conveying means to discharge the shelled grain to a suitable receptacle or conveying means.

In the operation of the structure as above described, the ears—and perhaps shelled grain and other trash—are dumped onto the husking roll 10 being carried therealong by the conveying chain 11. The grain drops through and around the rollers and the husks are removed and passed between the rolls. Considerable corn may also be removed from the ears by the husking rolls as it is difficult to devise rolls which are aggressive enough to remove the husks without shelling a considerable amount of corn. The husks and other material are engaged by the smooth contour portions A of the notched disks which raise and shake the husks without an aggressive forwarding motion. The shape of the notches, as previously described, is such that as soon as the curved surface A passes under the material, raising it vertically, the material may drop because of the radial edge B of the projections. This gives a shaking action along with the forwarding action. A further shaking action is obtained by the lifting of the elements 37 by the cams 30. This action is such that it may be termed as a shaker grid with the elements being oscillated by the cams. For different conditions of operation, the wall 23 may be adjusted with respect to the wall 22 to vary the position of the abutment 38 on which the shaker elements rest, thereby determining the amount of oscillation of said elements by the cams 30.

The husks and other material moved by the disks 29 generally in the direction of rotation of the projections on the disks and assisted by the shaking of the elements 37, pass outwardly and into the discharge chute 25 dropping out of the device.

It is to be understood that applicant has shown and described only a preferred embodiment of his improved shelled-corn saving device for corn husking mechanisms, and that he claims as his invention all modifications falling within the scope of the appended claims.

What is claimed is:
1. A grain saving means for a corn husking machine comprising in combination with husking rolls through which husks and shelled grain are delivered in a downward direction during operation, a shaft located beneath said rolls, a plurality of spaced trash and husk agitating and forwarding elements mounted on said shaft, a plurality of rod-like elements extending downwardly between said elements above said shaft and below the upper portions of the said elements, means for pivotally supporting the rod-like elements at one end, means for engaging, lifting and thereby vibrating said elements, and shelled-corn receiving means below said elements, said means including a receptacle having an upwardly extending wall on which the free ends of the rod-like elements rest when not engaged by said vibrating means.

2. Grain saving means for a corn husking machine comprising in combination with a pair of substantially horizontal husking rolls through which husks and shelled grain are delivered in a downward direction during operation, a shaft located beneath said rolls, a plurality of spaced notched disks mounted on said shaft, a plurality of loosely mounted grid forming elements extending downwardly between said disks above said shaft and below the upper portions of the disks, means for pivotally supporting said elements at one end, cams on said shaft between the disks for vibrating said elements, and shelled-corn receiving means below said shaker elements, said means including a receptacle having an upwardly extending adjustable wall on which the grid-forming elements abut, the adjustable wall providing means for varying lift on the grid forming elements by the cams.

3. In combination with a pair of husking rolls through which husks and shelled grain are delivered in a downward direction during operation, a substantially horizontal shaft located beneath said rolls, a plurality of spaced notched disks mounted on said shaft, a plurality of shaker elements extending downwardly between said disks above said shaft and below the upper portions of the disks, means for pivotally supporting said elements at one end, cams on said shaft between the disks for vibrating said elements, a shelled-corn receiving chamber below said shaker elements, and a grain forwarding auger mounted in said chamber, said chamber having a semi-cylindrical bottom and a wall extending upwardly under the shaker elements, said wall having an adjustable section to provide an adjustable abutment for the shaker elements.

ARNOLD E. W. JOHNSON.

REFERENCES CITED

The following references are of record in the file of this patent:

UNITED STATES PATENTS

| Number | Name | Date |
|---|---|---|
| 1,556,016 | Morral et al. | Oct. 6, 1925 |
| 795,773 | Johnston | July 25, 1905 |
| 1,109,302 | Rice | Sept. 1, 1914 |
| 401,862 | Shaffer | Apr. 23, 1889 |
| 1,485,872 | Nelson | Mar. 4, 1924 |
| 2,257,508 | Morral | Sept. 30, 1941 |
| 575,376 | Rosenthal | Jan. 19, 1897 |